United States Patent
Ranta (10) Patent No.: US 6,785,352 B1
(45) Date of Patent: Aug. 31, 2004

(54) METHOD AND CIRCUIT ARRANGEMENT FOR IMPLEMENTING INTER-SYSTEM SYNCHRONIZATION IN A MULTIMODE DEVICE

(75) Inventor: Jukka Ranta, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/504,995

(22) Filed: Feb. 15, 2000

(30) Foreign Application Priority Data

Feb. 19, 1999 (FI) .................................................. 990361

(51) Int. Cl.⁷ .............................. H04L 7/00; H04J 3/06
(52) U.S. Cl. ...................................... 375/354; 370/516
(58) Field of Search ................................ 375/354, 326, 375/350; 370/347, 294, 337, 228; 455/574, 343, 77, 450

(56) References Cited

U.S. PATENT DOCUMENTS

| | | | |
|---|---|---|---|
| 5,195,091 A | 3/1993 | Farwell et al. ............. | 370/94.1 |
| 5,526,359 A | 6/1996 | Read et al. ............... | 370/100.1 |
| 5,828,670 A | * 10/1998 | Narasimha et al. ......... | 370/516 |
| 5,870,441 A | 2/1999 | Cotton et al. ................ | 375/354 |

FOREIGN PATENT DOCUMENTS

WO  WO 98/25436  6/1998

* cited by examiner

Primary Examiner—Stephen Chin
Assistant Examiner—Edith Chang
(74) Attorney, Agent, or Firm—Perman & Green LLP (57) ABSTRACT

A method is presented for implementing synchronization between the timing of a first telecommunication system and the timing of a second telecommunication system. A first counter value is regularly updated at a pace determined by the first telecommunication system and a second counter value is regularly updated at a pace determined by the second telecommunication system. At a first time instant the current first counter value is stored. At a second, later time instant the stored counter value is read. Using the read counter value an operational step is timed so that its timing in relation to the timing of the first telecommunication system is known.

21 Claims, 9 Drawing Sheets

METHOD AND CIRCUIT ARRANGEMENT FOR IMPLEMENTING INTER-SYSTEM SYNCHRONIZATION IN A MULTIMODE DEVICE

TECHNOLOGICAL FIELD

The invention concerns generally the timing arrangements that determine the relations between the operation of a telecommunication device and a time base of a telecommunication system. Especially the invention concerns such timing arrangements in a situation where a single telecommunication device may operate in at least two telecommunication systems which have separate time bases. Digital cellular radio networks are dealt with as exemplary telecommunication systems.

BACKGROUND OF THE INVENTION

The concept of a frame period in one form or another constitutes the basis for most timing arrangements in a majority of telecommunication systems, although the definitions for a frame may vary. A frame is generally a piece of information that can be handled separately. A frame period is a time period of constant length and it represents the time which is available for handling a single frame. For example in the known GSM system (Global System for Mobile communications) there have been determined the concepts of a logical frame and a transmission frame: a logical frame is the piece of information that represents a speech period of 20 ms, and a transmission frame is a cyclically repeated time interval of approximately 4.615 ms that determines the radio transmission and reception turns of the base stations and mobile terminals. When synchronization between different telecommunication systems is contemplated, the timing and mutual arrangement of transmission frames is of primary importance.

Figure 1:
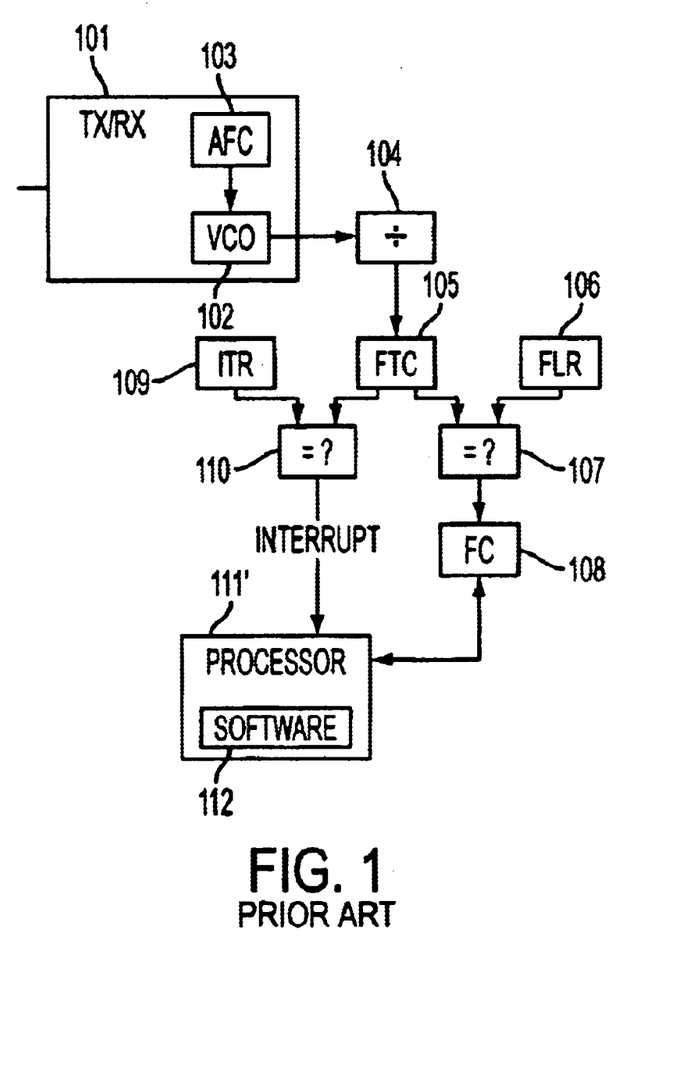
FIG. 1 illustrates a known single frame synchronization arrangement.

FIG. 1 illustrates a known arrangement for maintaining transmission frame synchronization in a mobile terminal of a digital cellular radio network. The radio transceiver 101 of the mobile terminal comprises a voltage controlled oscillator or VCO 102 and an automatic frequency control unit or AFC unit 103 for maintaining the oscillation frequency of the VCO exactly at a certain value which is determined by the base station (not shown) with which the mobile terminal is communicating. A derivation block 104 converts the frequency of the VCO into a suitable lower frequency known as the Frame Time Counter input clock or FTC input for short.

The derivation block may be a single functional block or it may consist of distributed frequency division and/or multiplication units. The FTC input frequency is typically very closely related to the symbol or chip frequency: it may be for example four or eight times the symbol or chip frequency. It is conducted to a Frame Time Counter or FTC 105 which is simply a counter the value of which is incremented by one per each period of the FTC input.

The length of a frame period has been stored in a Frame Length Register or FLR 106, and comparison means 107 are arranged as a part of or in close association with the FTC to compare the value of the FTC against the stored frame length in the FLR. Each time the FTC reaches the value that corresponds to the stored frame length, the FTC is reset and the value of a Frame Counter or FC 108 is incremented by one. The purpose of the FC is to keep track of the unique identification number of the current frame. It may contain either the full number of each frame or a shortened number in which latter case it is on the responsibility of other parts of the timing arrangement to map the current shortened value in the FC to a full identification number of the current frame.

An Interrupt Timing Register or ITR 109 is provided for storing the value(s) of the FTC that require interrupts to be generated. There may be also multiple ITRs. Each time the corresponding comparison means 110 detect that the value of the FTC equals a value stored in (one of) the ITR(s) they will generate an interrupt to a processor 111. The operation of the processor is determined by the software 112 which the processor is executing: one of the functions of the software is to detect and identify the interrupts and to take whatever action that has been associated with a certain interrupt. There is also a connection from the processor to the FC 108.

The system of FIG. 1 is only applicable for implementing the frame synchronization of one telecommunication system. Currently the mobile terminals of digital cellular radio networks are evolving towards multimode operation which means that a single terminal should be able to selectably communicate with at least two different telecommunication systems with no common time base. Handovers from one system to another should be as seamless as possible, and while a terminal is communicating with one system it should be able to perform synchronized signal strength measurements and other operations in the other system(s). There exists therefore a need for a frame synchronization system that would simultaneously provide exact synchronization information relating to at least two telecommunication systems.

Figure 2:
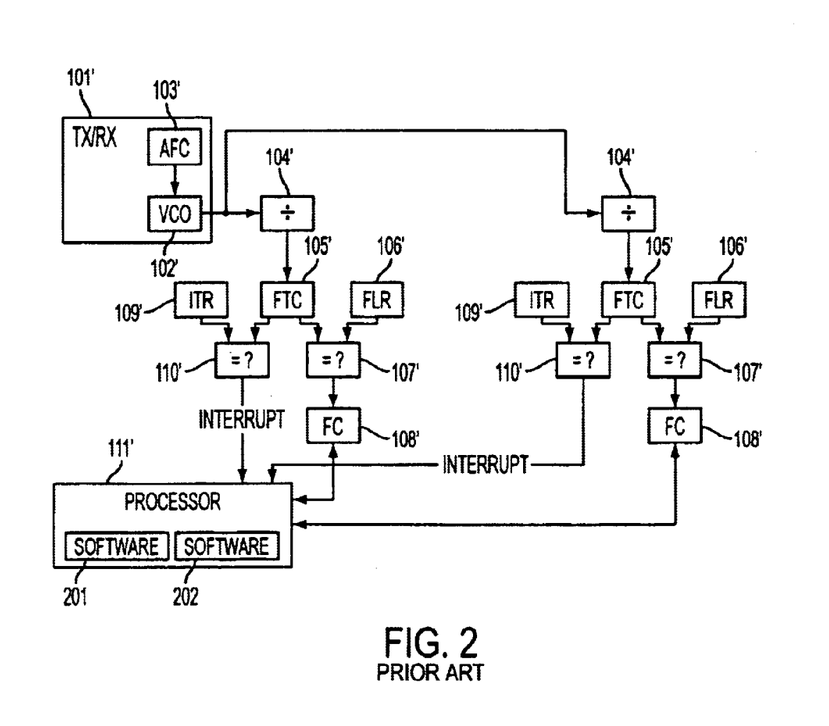
FIG. 2 illustrates a known double frame synchronization arrangement.

FIG. 2 illustrates an obvious modification to the system of FIG. 1 to enable double-mode frame synchronization. It has been assumed that a single VCO 102' in a certain transceiver 101' is used as the source for the timing signals. There are provided, in parallel, two derivation blocks 104', two FTCs 105', two FLRs 106', two FCs 108', two ITRs 109' and two comparison means 107' and 110'. The processor 111 executes a first software 201 to comply with the requirements of a first telecommunication system and a second software 202 to comply with the requirements of a second telecommunication system. The processor receives interrupts from both frame synchronization circuit arrangements, and "soft" comparisons are made between the interrupt moments to determine the mutual relations of the frame timings. The idea can be generalized to multimode terminals by adding parallel synchronization circuit arrangements and interrupt lines to the processor.

The drawback of the system of FIG. 2 is its dependency on software execution and interrupt signals. Even with real time operating systems it is difficult to make a processor react to two different interrupts with exactly the same time constant, whereby error is introduced into the synchronization arrangement. Even if the processor would react promptly to all interrupts there may be different delays outside the processor in the generation of the interrupts, and in a practical case the outside delays will add up with the internal interrupt detection and response uncertainties to produce an unpredictable source of timing errors.

SUMMARY OF THE INVENTION

It is an object of the present invention to provide a synchronization method and arrangement for realizing multimode frame synchronization with high accuracy. A further object of the invention is to provide such a synchronization method and arrangement with reasonably low circuit complexity and current consumption. An additional object is to provide the synchronization arrangement in a form that is readily produced in the form of an integrated circuit.

The objects of the invention are achieved by latching a snapshot of the values of certain frame timing counters and frame counters into a register at known time instants.

It is characteristic to the circuit arrangement according to the invention that it comprises
- a first counter and a second counter,
- first snapshot storage means responsive to a first triggering signal for storing the value of said first counter that coincides with the reception of said first triggering signal and
- a processor for reading the stored value of said first counter and for timing an operational step so that its timing in relation to the timing of a first telecommunication system is known.

The invention applies also to a method comprising the characteristic steps of
a) regularly updating a first counter value at a pace determined by the first telecommunication system,
b) regularly updating a second counter value at a pace determined by the second telecommunication system,
c) at a first time instant storing the current first counter value,
d) at a second, later time instant reading the counter value stored at step c) and
e) using the counter value read at step d) to time an operational step so that its timing in relation to the timing of the first telecommunication system is known.

Additionally the invention applies to a radio telecommunication device for communicating with a first telecommunication system and a second telecommunication system. It is characteristic to the radio telecommunication device that it comprises
- a first counter responsive to the frame time counter input clock generated in a first radio transceiver,
- a second counter responsive to the frame time counter input clock generated in a second radio transceiver,
- first snapshot storage means responsive to a first triggering signal for storing the value of said first counter that coincides with the reception of said first triggering signal and
- a processor for reading the stored value of said first counter and for timing an operational step so that its timing in relation to the timing of the first telecommunication system is known.

According to the invention there is provided a first frame synchronization arrangement for keeping track of the frame timing of a first telecommunication system, and a second frame synchronization arrangement for keeping track of the frame timing of a second telecommunication system. Snapshot storage means are provided for temporarily storing exact values that describe the state of at least one frame synchronization arrangement at a given time instant. The snapshot storage means are responsive to certain triggering signals so that said given time instants will correspond to the issue of the triggering signals.

Several alternatives are available for the generation of the triggering signals. According to a first alternative there are snapshot storage means for each frame synchronization arrangement and a processor will issue the triggering signals directly so that it will inherently know the time instant which certain existing contents of the snapshot storage means will correspond to. There may even be only one triggering line through which a triggering signal will be conducted simultaneously to all snapshot storage means. In a simplified version of the first alternative there is one frame synchronization arrangement without snapshot storage means and the processor will rely on frame synchronization information from that frame synchronization arrangement in issuing the trigger commands to the existing snapshot storage means.

According to a second alternative a first frame synchronization arrangement will issue a triggering signal to the snapshot storage means of a second frame synchronization arrangement at a time instant the relation of which to the frame timing in the first frame synchronization arrangement is known. Redundancy may be introduced into the second alternative by cross-exchanging the triggering signals so that the first frame synchronization arrangement will trigger the snapshot storage means of a second frame synchronization arrangement and vice versa.

According to a third alternative there is a separate triggering signal generator that will issue triggering signals to all snapshot storage means either simultaneously or according to a known schedule.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

FIGS. 1 and 2 have been dealt with in the description of prior art, so the following discussion of the invention will focus on FIGS. 3a to 8. Like parts in the drawings will be referred to by same reference designators.

DETAILED DESCRIPTION OF THE INVENTION

Figure 3A:
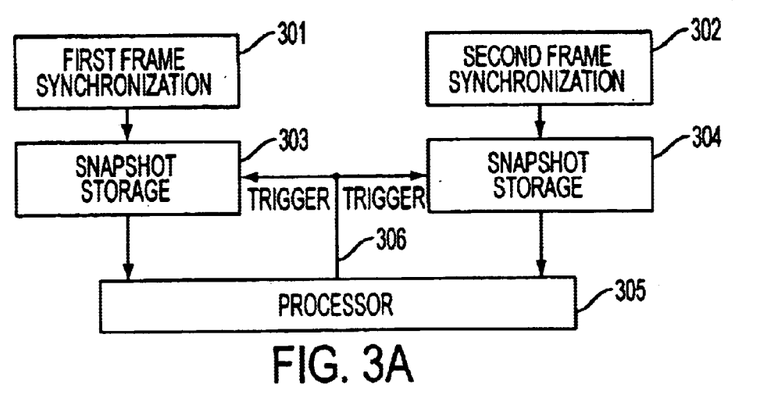
FIGS. 3a to 3c illustrate frame synchronization principles according to a first alternative embodiment of the invention.

In FIG. 3a a first frame synchronization arrangement 301 and a second frame synchronization arrangement 302 are shown. In the following description the concept "frame synchronization arrangement" will refer generally to a system that is capable of maintaining up-to-date information about the current frame timing of a certain telecommunication system. If we compare to the described prior art arrangements in FIGS. 1 and 2, such a frame synchronization arrangement would consist of the FTC, FLR and FC blocks and their interconnections. As an input a frame synchronization arrangement may receive a clock signal, and as an output it is capable of providing, at a given time instant, the current frame number and a position within that frame.

In FIG. 3a each frame synchronization arrangement is coupled to a snapshot storage 303 and 304. A snapshot storage is a latched memory block responsive to a certain triggering signal. At the occurrence of a triggering signal the snapshot storage will store the current state at its input. For the rest of the time the contents of the snapshot storage may be read to find out the latest stored input state. The frame synchronization arrangements and their corresponding snapshot storages in FIG. 3a are arranged to store the frame timing information given by the frame synchronization arrangement at each occurrence of a triggering signal to the snapshot storage.

A processor 305 is additionally provided in FIG. 3a, coupled to each snapshot storage 303 and 304. On one hand the coupling enables the processor to read the contents of the snapshot storages at any given time instant, and on the other hand the processor is also coupled to the triggering inputs of the snapshot storages so that it may issue the triggering signals. To ensure that a triggering signal will reach both snapshot storages simultaneously there is a single triggering line 306 that is connected to both snapshot storages.

The arrangement of FIG. 3a operates according to the following explanation. Each frame synchronization arrangement maintains current frame timing information of its own telecommunication system. At a given time instant determined by the software executed by the processor, a triggering signal is given to both snapshot storages. As a result the snapshot storages store a copy of the frame timing information from both frame synchronization arrangements. At a certain later time instant the processor reads the contents of the snapshot storages and compares them against each other. This way the processor will find out the mutual timing relations of the different telecommunication systems. As an example, the processor may note that a certain time instant corresponded to symbol s1 of frame f1 in the first telecommunication system and to symbol s2 of frame f2 in the second telecommunication system. At a certain even later time instant the processor may repeat the triggering and reading steps to find out that this time symbol s1' of frame f1' of the first telecommunication system was concurrent with symbol s2' of frame f2' of the second telecommunication system. By making a number of measurements and by extrapolating the detected trend of coexistent timing information the processor will soon be able to predict, which symbols in which frames will be concurrent in the near future, so that inter-system frame synchronization has actually been achieved.

The frame timing information may naturally be completely independent of symbols: the length of a frame may be determined in some arbitrary calculational units, in which case the word "symbol" in the foregoing explanation should simply be replaced by the expression "calculational unit". If there is a constant linear relation between the frame timing information of the two telecommunication systems, the prediction of a certain desired co-occurrence (for example the simultaneous occurrence of a frame border) is straightforward with two triggering and reading rounds. The number of calculational units passed between the two rounds in association with each telecommunication system is detected, and their quotient is used as a prediction factor that tells, how many calculational units associated with the first system correspond to a given number of calculational units associated with the second system. However, in a practical situation there will be random variations in the relation between the frame timing information, so regular triggering and reading rounds associated with a constantly updating prediction algorithm will give the best result. Such algorithms are known as such from the field of predictive statistics.

The arrangement of FIG. 3a is easily generalized to multimode communication devices by adding more frame synchronization arrangements and their corresponding snapshot storages in parallel with the existing ones and by coupling the triggering inputs of all snapshot storages to the common triggering line 306.

Figure 3B:
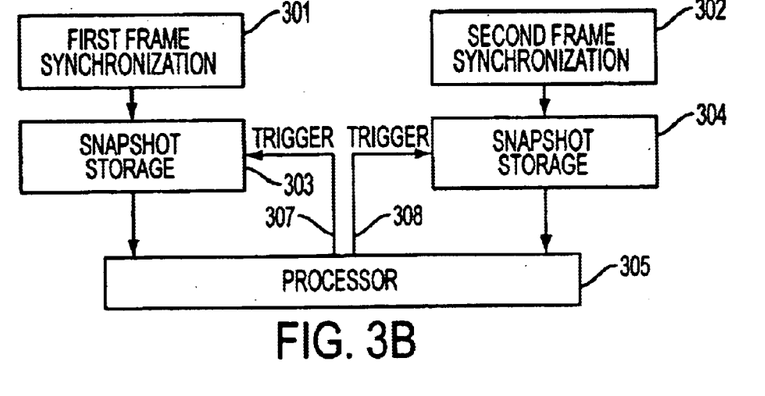

FIG. 3b illustrates a slightly modified version of the system of FIG. 3a. Here the processor 305 has separate triggering lines 307 and 308 to the snapshot storages. This approach is more versatile because the processor may separately determine the triggering time instants for the different systems, but some of the accuracy inherently present in the FIG. 3a system must be sacrificed because it is difficult to time the operation of two independent output lines from a processor according to an exactly known schedule. The operation of the system of FIG. 3b may follow one of a number of alternative patterns. For example, the processor may trigger both snapshot storages every now and then and make predictions based on the resulting observations. Alternatively the processor may operate according to some known timing aspects of a first telecommunication system and trigger the snapshot storage of the other telecommunication system upon the occurrence of certain important events associated with the first telecommunication system; after a handover from one system to another the roles would be changed.

Generalization to multimode devices is again straightforward: the only difference to the previously explained generalization of the FIG. 3a system is that there must be an independent triggering line to each snapshot storage. A combination of FIGS. 3a and 3b is also possible in multimode devices with at least three snapshot storages: some of the snapshot storages may be coupled to a common triggering line while others have their own triggering lines.

Figure 3C:
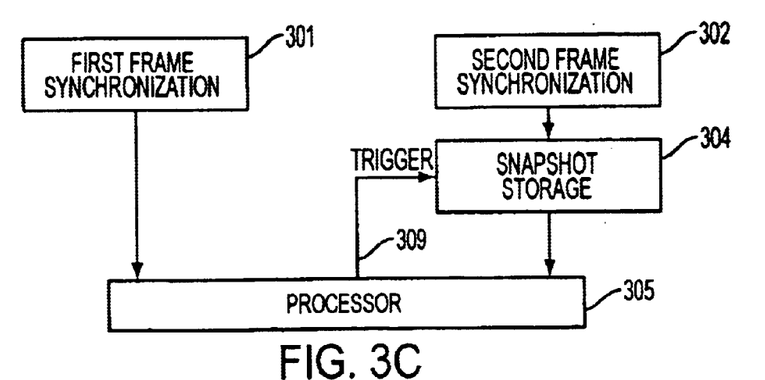

FIG. 3c illustrates a simplified embodiment where one frame synchronization arrangement 301 is directly coupled to the processor 305 without a snapshot storage, but the other 302 has one 304. The processor 305 gives the triggering signal to the existing snapshot storage 304 through line 309. This arrangement operates according to the last alternative given above: the processor is continuously aware of the frame timing in the first telecommunication system and triggers the snapshot storage whenever it wants to find out the mutual timing relations of the systems.

A generalization of the FIG. 3c principle to multimode devices calls for one frame synchronization arrangement to have a direct connection to the processor while the others must be equipped with snapshot storages. Any combination of common and/or independent triggering lines to the snapshot storages is possible.

Figure 4A:
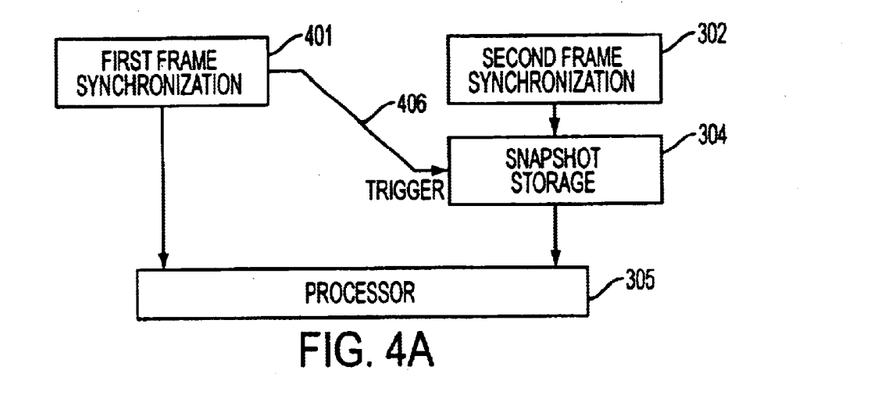
FIGS. 4a and 4b illustrate frame synchronization principles according to a second alternative embodiment of the invention.

FIG. 4a shows a slightly different triggering approach: here again one of the frame synchronization arrangements 401 is coupled to the processor 305 without a snapshot storage while the other 302 has one 304, but this time the first frame synchronization arrangement 401 is arranged to provide the triggering signal through line 406. The idea is that within the first frame synchronization arrangement 401 there has been stored an indication about which events in the frame timing of the first telecommunication system should cause a snapshot to be stored about the simultaneous frame timing situation of the other telecommunication system(s). For example it may have been determined that each time when a frame timing counter in the first frame synchronization arrangement reaches a certain value (e.g. the one corresponding to a complete frame), the snapshot storage means is used to store the corresponding frame timing information given by the second frame synchronization arrangement. The processor 305 has then the possibility to regularly read from the existing snapshot storage 304, how exactly did the "unknown" frame timing in the second telecommunication system relate with the known time instants associated with the first telecommunication system that caused the triggerings.

The system of FIG. 4a is most easily generalized to multimode devices so that only a first frame synchronization arrangement does not have a snapshot storage, and this particular frame synchronization arrangement issues the triggering commands to the snapshot storages of the other frame synchronization arrangements according to a known schedule that is bound to the frame timing of the first telecommunication system.

Figure 4B:
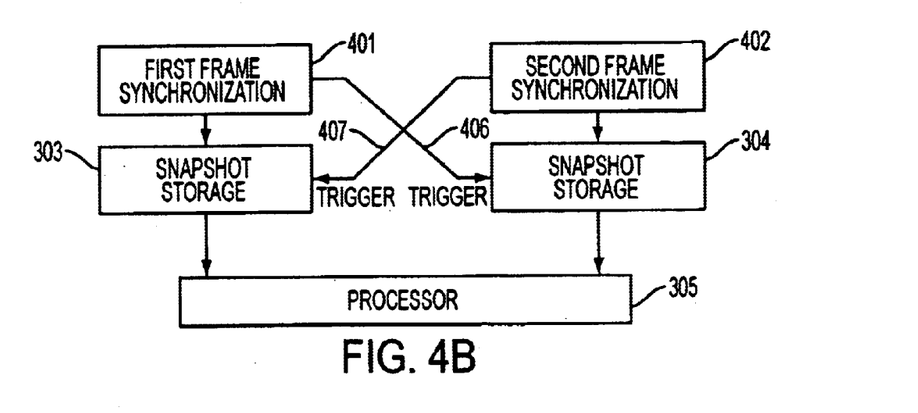

FIG. 4b illustrates the introduction of redundancy into the principle of FIG. 4a. Here there are two frame synchronization arrangements 401 and 402, each of them having a snapshot storage 303 and 304 and each of them also being equipped to trigger the snapshot storage of the other frame synchronization arrangement through lines 406 and 407. An advantageous way of exploiting the system of FIG. 4b is to make both frame synchronization arrangements generate a triggering signal at the completion of a frame, whereby the processor 305 may at any time read from the snapshot storage means 303 and 304, how was the frame timing of one telecommunication system last time related to the frame border of the other telecommunication system.

The principle of FIG. 4b may be generalized to multimode devices by chaining the triggering signals: the first frame synchronization arrangement triggers the second snapshot storage, the second frame synchronization arrangement triggers the third snapshot storage and so on until the the N:th frame synchronization arrangement triggers the first snapshot storage; here N is a positive integer greater than or equal to 3.

Figure 5A:
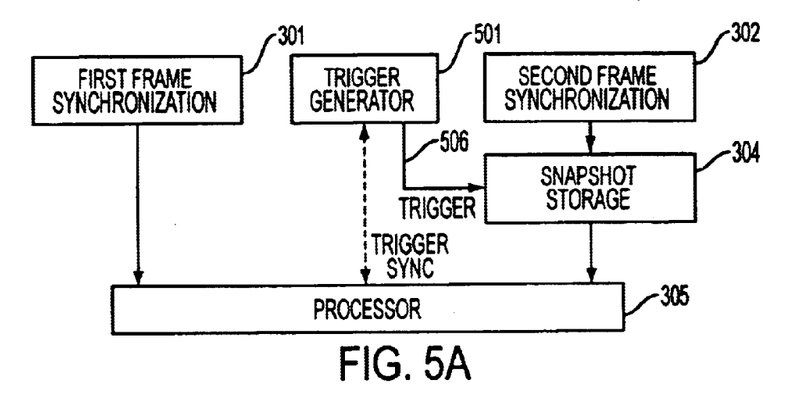
FIGS. 5a to 5c illustrate frame synchronization principles according to a third alternative embodiment of the invention.
Figure 5B:
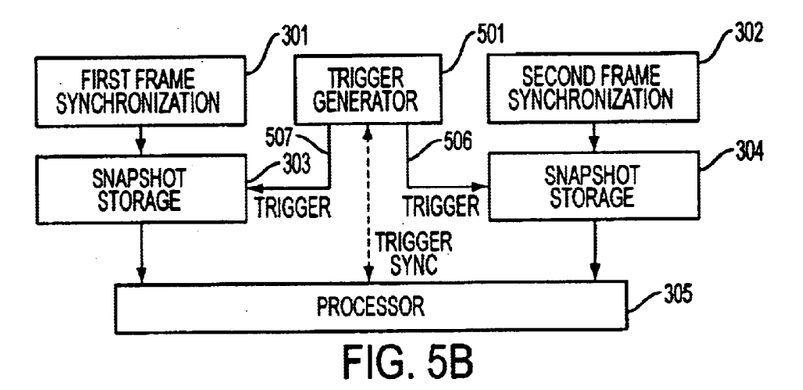
Figure 5C:
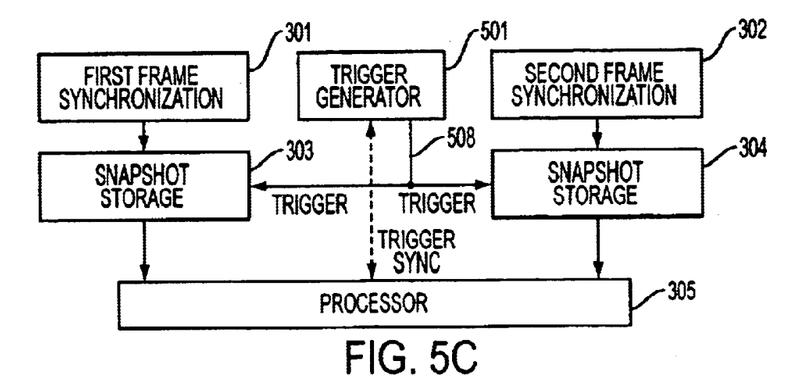

FIGS. 5a to 5c illustrate alternative triggering arrangements where the triggering signal comes from a separate trigger generator circuit 501 which may have a trigger synchronization connection to the processor 305. In FIG. 5a the processor operates according to the constantly known timing of the first telecommunication system and gives corresponding triggering instructions to the trigger generator circuit 501 so that it will correctly trigger the existing snapshot storage 304 through line 506. In FIG. 5b the trigger generator circuit 501 has the possibility to give independent triggering signals to both snapshot storages 303 and 304 through lines 506 and 507, and in FIG. 5c a common triggering line 508 is used to simultaneously trigger both snapshot storages. Generalization to multimode devices is again straightforward.

Figure 6A:
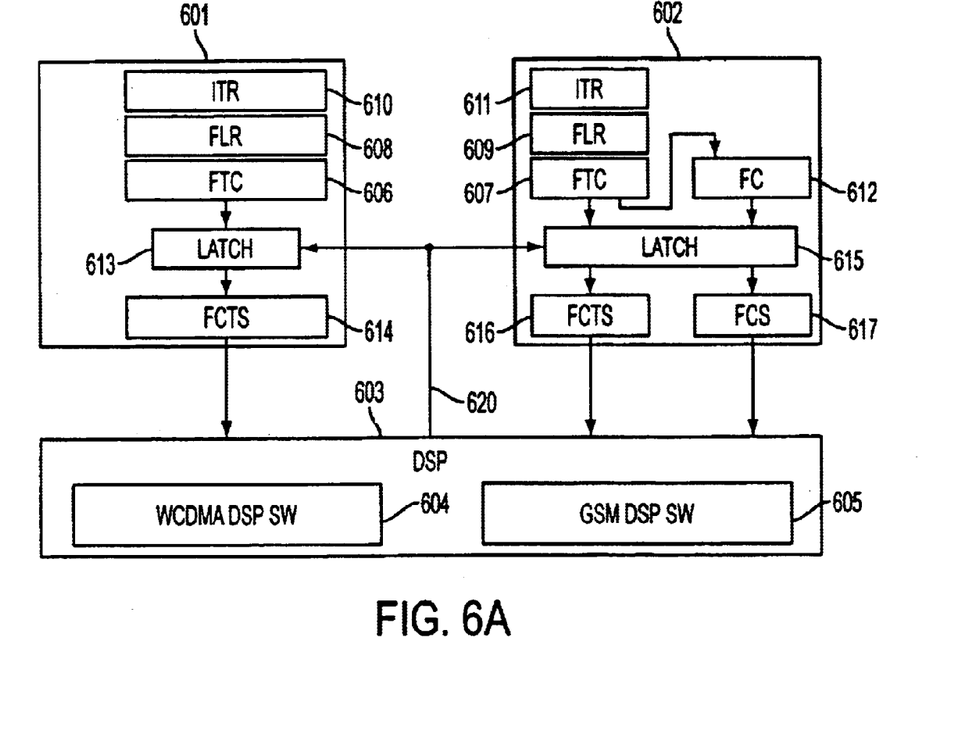
FIG. 6a is a more detailed illustration of an embodiment of the invention.

FIG. 6a illustrates a more detailed implementation of the principle introduced above in connection with FIG. 3a. The circuit arrangement comprises three main blocks, namely a first logic block 601, a second logic block 602 and a DSP or digital signal processor 603. The division into blocks is illustrative and does not place any limitations to the location of corresponding components in certain physical entities. Each logic block corresponds to a certain telecommunication system: in FIG. 6a we have assumed that the first telecommunication system is a WCDMA system (Wideband Code Division Multiple Access) like that which has been accepted as a part of the UMTS specification (Universal Mobile Telecommunication System), and the second telecommunication system is a GSM system. The DSP is able to run both a WCDMA software 604 and a GSM software 605. To this end it needs synchronization information in the form of frame time counter readings from the WCDMA logic block 601 and frame time counter and frame counter readings from the GSM logic block 602.

For providing the required synchronization information each logic block comprises a frame time counter or FTC 606, 607. The GSM logic block also comprises a frame counter or FC 612 and a connection from the FTC to the FC for advancing the frame count at each resetting of the FTC. Each logic block will probably also comprise a frame length register or FLR 608, 609 and an interrupt timing register or ITR 610, 611, but these are not directly associated with the present invention. The WCDMA logic block 601 comprises a single latch 613 and an FTC snapshot memory or FCTS 614 for temporarily storing FTC readings. Correspondingly the GSM logic block 602 comprises a double latch 615, an FTC snapshot memory or FCTS 616 and an FC snapshot memory or FCS 617 for temporarily storing both FTC and FC readings. All combinations of a latch and a snapshot memory are responsive to a triggering signal 620 coming from the DSP 603, and all snapshot memories are accessible to the DSP for reading their contents.

The operation of the arrangement of FIG. 6a goes as follows. The FTCs 606, 607 and the FC 612 operate in a known manner which has been explained in the description of prior art. The generation of the required FTC inputs (not shown) is outside the scope of the present invention but well within the capabilities of a person skilled in the art. At a certain time instant the DSP 603 issues a triggering signal to the latches 613 and 615. As a response the latches transfer a copy of the current FTC and FC readings to the respective snapshot memories 614, 616 and 617. At a certain later time instant the processor reads the contents of the snapshot memories to find out, what FTC and FC values in the GSM system coincided with a certain FTC value in the WCDMA system or vice versa. The round of triggering, transfering and reading may be repeated an arbitrary number of times.

In a simplest possible circuit arrangement the snapshot memories are each arranged to store only one value, whereby a subsequent triggering signal will cause the previously stored value to be erased upon the storage of a new value. In a slightly more complicated embodiment of the invention each snapshot memory is an array of distinct memory locations, whereby a number of subsequently stored readings are available at any given time. If the arrays are cyclically arranged, storing a new value will only cause the erasure of the oldest previous value.

The software executed by the DSP determines, how the DSP will exploit the stored FTC and FC values. If the storing of multiple FTC and FC values is possible, the processor may even issue a whole series of triggering signals to fill the snapshot memories and only thereafter start reading their contents. The pointers that determine the reading and writing locations in arrayed snapshot memories must naturally be synchronized so that each stored reading in a first snapshot memory corresponds unequivocally to certain other, simultaneously stored readings in the other snapshot memories.

Figure 6B:
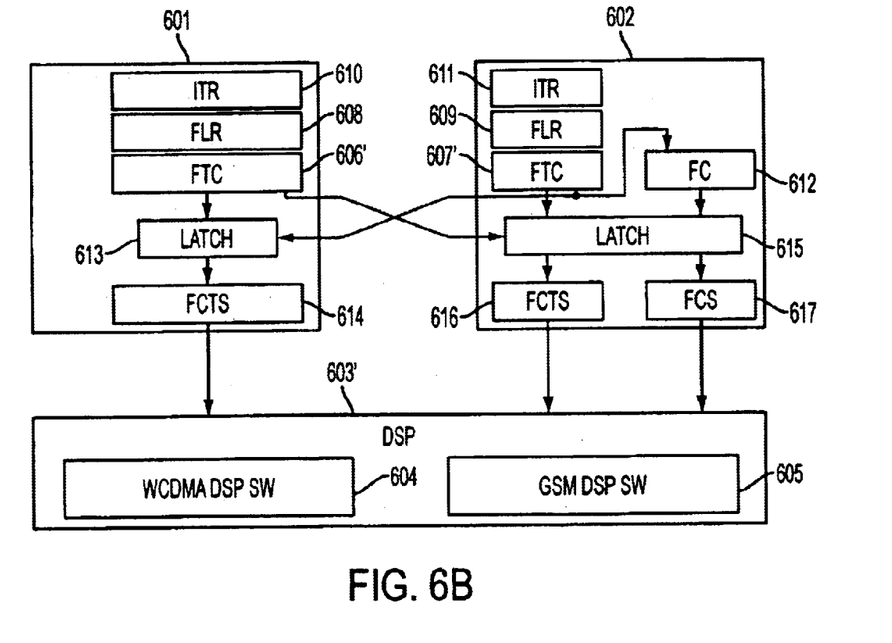
FIG. 6b is a more detailed illustration of another embodiment of the invention.

FIG. 6b correponds to FIG. 6a what comes to the existence of the components, but the connections for issuing the triggering signals follow the principle of FIG. 4b. The FTCs 606' and 607' are each arranged to issue a triggering signal to the latch of the other logic block upon resetting, and the processor 603' is not responsible for issuing any triggering signals but has been programmed to acknowledge the fact that each snapshot memory will contain readings that correspond to previous FTC reset(s) in the other telecommunication system. The above-given considerations regarding the use of single or arrayed snapshot memories apply.

Figure 7:
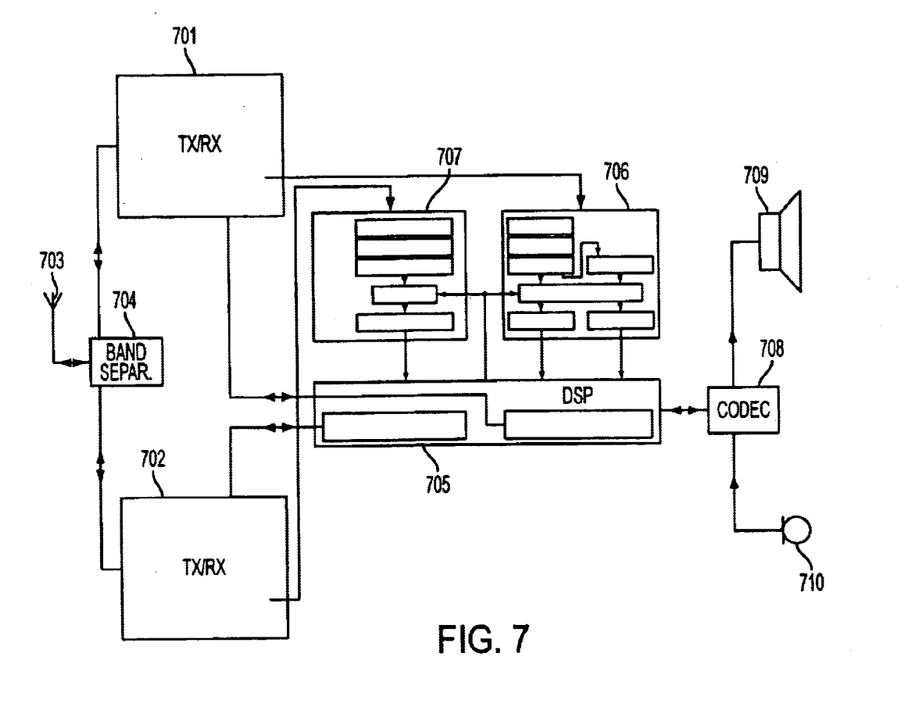
FIG. 7 illustrates a telecommunication device according to the invention and FIG. 8 is a schematic representation of a method according to the invention.

FIG. 7 is a schematic illustration of a dual band mobile telephone where a first transceiver block 701 and a second transceiver block 702 share a common antenna 703 through a band separation block 704. The baseband processing related to both operation bands takes place in a digital signal processor 705, and to provide synchronization information to it there are a first synchronization logic block 706 and a second synchronization logic block 707. Each transceiver provides a timing input to one of the synchronization logic blocks. A speech codec block 708 is provided for coupling the DSP to a loudspeaker 709 and a microphone 710. The structure and operation of blocks 705, 706 and 707 correspond to the above-given discussion of the arrangement of FIG. 6a.

Figure 8:
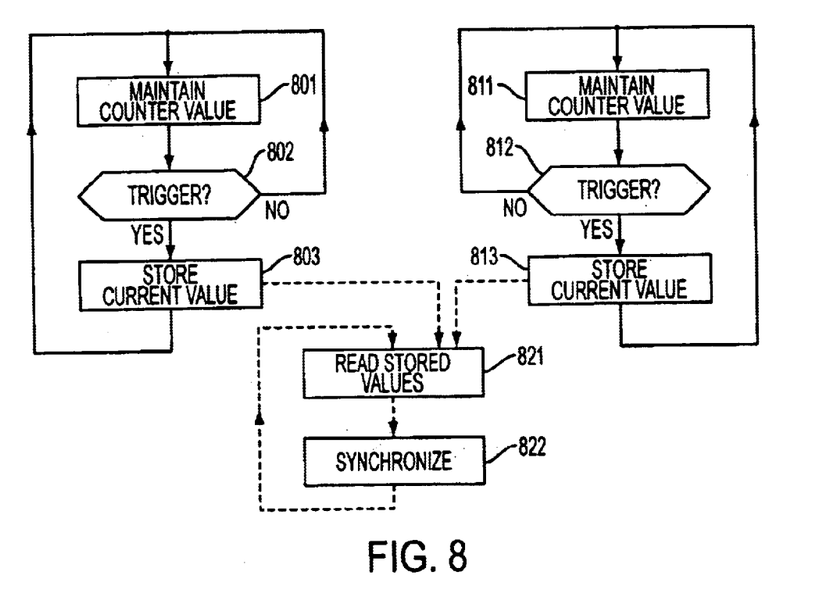

FIG. 8 illustrates such a method according to the invention which is applicable within the arrangements of FIGS. 3a, 3b, 4b, 5b and 5c. There are actually three different method loops which may operate even quite independently from each other. The loop through states 801, 802 and 803 corresponds to maintaining a FTC value or some other synchronization information that is relevant to a first telecommunication system, waiting for a trigger signal and at the reception of one storing the current value of the synchronization information. The similar loop through states 811, 812 and 813 corresponds to performing the same operations with respect to a second telecommunication system. In the third loop state 821 corresponds to reading a number of stored values and state 822 to performing some kind of synchronization on the basis of the information read at state 821. The synchronization may mean for example finding out the frame timing of a second telecommunication system and executing a measurement round or location update in the second telecommunication system exactly when there is a prescribed time for that even when the timing of operations is otherwise dictated by the needs of the first telecommunication system.

The above-given specific embodiments of the invention are naturally only exemplary and they do not limit the applicability of the invention within the coverage of the appended claims.

What is claimed is:

1. A method for implementing synchronization between the timing of a first telecommunication system and the timing of a second telecommunication system, comprising the steps of:
   a) regularly updating a first counter value at a pace determined by the first telecommunication system, the pace being related to a time base of the first telecommunication system,
   b) regularly updating a second counter value at a pace determined by the second telecommunication system, the pace being related to a time base of the second telecommunication system, the time base of the second telecommunication system being different than the time base of the first telecommunication system,
   c) at a first time instant reading the current first counter value and storing the read first counter value into a storage location different from the counter itself,
   d) at a second, later time instant reading the counter value stored at step c) and
   e) using the counter value read at step d) to time an operation performed by a processor so that the timing of the operation in relation to the timing of the first telecommunication system is known.

2. A method according to claim 1, comprising, as a part of step c), the step of storing the current first and second counter values.

3. A method according to claim 2, wherein the storing of the current first and second counter values takes place as a response to a common triggering signal.

4. A method according to claim 1, additionally comprising the steps of
   c') at a third time instant storing the current second counter value,
   d') at a fourth, later time instant reading the counter value stored at step c') and
   e') using the counter value read at step d') to time an operation performed by the processor so that the timing of the operation in relation to the timing of the second telecommunication system is known.

5. A method according to claim 4, wherein said third time instant is the same as said first time instant.

6. A method according to claim 1, additionally comprising the steps of
   c") at multiple time instants following said first time instant storing the current first counter value,
   d") reading the counter values stored at step c") and
   e") at step e) using additionally the counter values read at step d") to time an operation performed by the processor so that the timing of the operation in relation to the timing of the first telecommunication system is known.

7. A circuit arrangement for implementing synchronization between the timing of a first telecommunication system and the timing of a second telecommunication system, comprising:
   a first counter associated with a time base of the first telecommunication system and a second counter associated with a time base of the second telecommunication system, wherein the time base of the first telecommunication system is not common to the time base of the second telecommunication system,
   first snapshot storage means responsive to a first triggering signal for storing the value of said first counter that coincides with the reception of said first triggering signal, and
   a processor for reading the stored value of said first counter and for timing an operation performed by the processor so that the timing of the operation in relation to the timing of the first telecommunication system is known.

8. A circuit arrangement according to claim 7, additionally comprising second snapshot storage means responsive to a second triggering signal for storing the value of said second counter that coincides with the reception of said second triggering signal.

9. A circuit arrangement according to claim 8, wherein said second snapshot storage means is responsive to the same triggering signal as said first snapshot storage means.

10. A circuit arrangement according to claim 9, wherein said processor is arranged to issue the combined first and second triggering signal.

11. A circuit arrangement according to claim 8, comprising means for generating said first triggering signal as a response to a certain predetermined state of said second counter and means for generating said second triggering signal as a response to a certain predetermined state of said first counter.

12. A circuit arrangement according to claim 7, wherein said first snapshot storage means is arranged to store multiple values of said first counter.

13. A circuit arrangement according to claim 7, comprising, outside said processor, a triggering signal generator for generating said first triggering signal.

14. A radio telecommunication device for communicating with a first telecommunication system and a second telecommunication system, comprising a first radio transceiver and a second radio transceiver and within each radio transceiver for generating a frame time counter input clock, comprising:

a first counter responsive to the frame time counter input clock generated in the first radio transceiver, a second counter responsive to the frame time counter input clock generated in the second radio transceiver, wherein the frame time counter input clock generated in the first radio transceiver is isolated from and not common to the frame time counter input clock generated in the second radio transceiver, first snapshot storage means responsive to a first triggering signal for storing the value of said first counter that coincides with the reception of said first triggering signal, and a processor for reading the stored value of said first counter and for timing an operation performed by the processor so that the timing of the operation in relation to the timing of the first telecommunication system is known.

15. A method of synchronizing a timing between a timing of a first telecommunication system and a timing of a second telecommunication system comprising:

updating a first counter value at a pace determined by the first telecommunication system;

updating a second counter value at a pace determined by the second telecommunication system wherein the pace determined by the first telecommunication system is not related to the pace determined by the second telecommunication system;

at a first time instant in response to a common triggering signal, storing a current first and a current second counter value;

at a subsequent time instant reading the stored current first and second counter values; and using the read stored current first and second counter values to time an operation of a processor so that the timing of the operation in relation to the timing of the first telecommunication system is known.

16. The method of claim 15 further comprising:

at a third time instant storing the current second counter value;

at a fourth, later time instant reading the counter value stored at the third time instant; and using the counter value read at the fourth, later time instant, to time an operation of the processor so that the timing of the operation in relation to the timing of the second telecommunication system is known.

17. The method of claim 16 wherein the third time instant is the same as the first time instant.

18. The method of claim 15 further comprising:

at multiple time instants following the first time instant storing the current first counter value;

reading the counter values stored at the multiple time instants; and using the read stored current first and second counter values to time another operation of the processor, using additionally the counter values read at the multiple time instants to time the operation of the processor so that the timing of another operation in relation to the timing of the first telecommunication system is known.

19. The circuit arrangement of claim 7 wherein the first snapshot storage means responsive to the first triggering signal reads the value of the first counter that coincides with the reception of the first triggering signal and stores the read value in a storage location different from the counter itself.

20. The radio telecommunication device of claim 14 wherein the first snapshot storage means responsive to the first triggering signal reads the value of the first counter that coincides with the reception of the first triggering signal and stores the read value in a storage location different from the counter itself.

21. A method of arranging a timing in a single telecommunication device operating in at least two mutually separate telecommunication systems comprising:

determining a timing of an operation in a first telecommunication system having a first time base by regularly updating a first counter value at a pace determined by the first telecommunication system, the pace being related to a time base of the first telecommunication system, and at a first time instant reading the current first counter value and storing the read first counter value into a storage location different from the counter itself;

determining a timing of an operation in a second telecommunication system having a second time base mutually exclusive from the first time base by regularly updating a second counter value at a pace determined by the second telecommunication system, the pace being related to a time base of the second telecommunication system, the time base of the first telecommunication system being different than the time base of the second telecommunication system, at a second, later time instant reading the stored read first counter value; and the second telecommunication system using the determined timing in the first telecommunication system to time an operation in the single telecommunication device by using the counter value read at the second, later time instant to time an operation performed by a processor so that the timing of the operation in relation to the timing of the first telecommunication system is known.

* * * * *